April 1, 1941.　　　D. F. BABCOCK　　　2,236,964
SEPARATION OF ACETYLENE FROM MIXTURES
Filed June 10, 1938
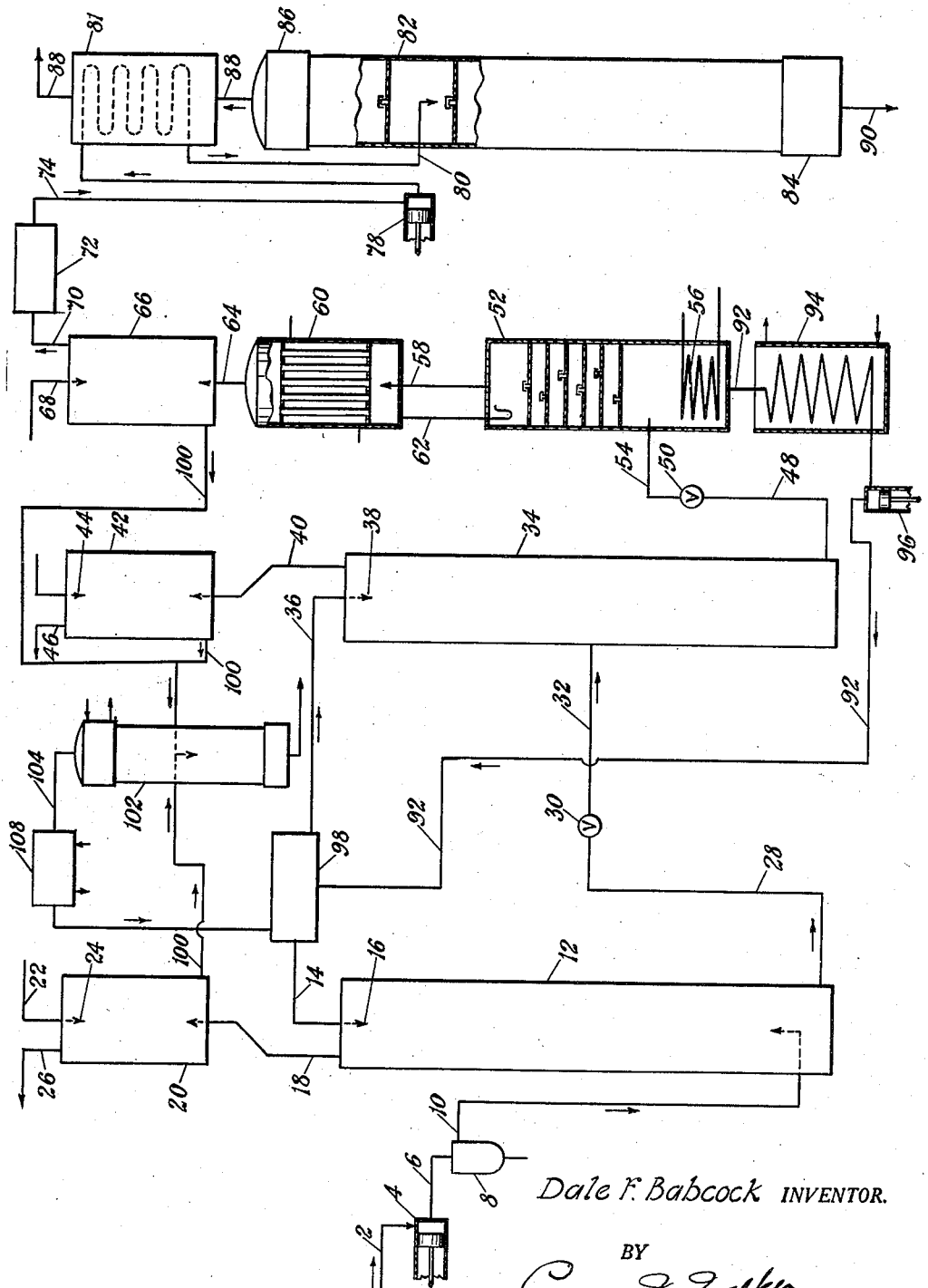
Dale F. Babcock INVENTOR.
BY
George W. Walker ATTORNEY Patented Apr. 1, 1941

2,236,964

UNITED STATES PATENT OFFICE 2,236,964

SEPARATION OF ACETYLENE FROM MIXTURES

Dale F. Babcock, Wilmington, Del., assignor to E. I. du Pont de Nemours & Company, Wilmington, Del., a corporation of Delaware Application June 10, 1938, Serial No. 212,905

2 Claims. (Cl. 62—175.5)

This invention relates to the recovery of concentrated acetylene gas from admixture with other gases, and more particularly to the recovery from mixtures with other hydrocarbons boiling above and below acetylene and with hydrogen.

Until recently all acetylene was manufactured from calcium carbide but its use for chemical synthesis has created such a demand for acetylene that attempts have been made to obtain it from other sources. Most of these attempts have been in the field of high temperature cracking of gaseous or liquid hydrocarbons, usually by means of an electric arc. The gas produced by this cracking step consists chiefly of hydrogen and acetylene but contains in addition small quantities of other hydrocarbons boiling above and below acetylene. These hydrocarbons are mostly unsaturated and consist chiefly of ethylene, propylene, butylenes, methyl acetylene, and diacetylene. There are many known ways of partially removing the hydrocarbon impurities in order to concentrate the acetylene but no known process discloses a complete operation for the removal of all of these impurities and at the same time separating highly concentrated acetylene gas from the hydrogen.

This invention has as its object the recovery of concentrated acetylene gas from admixture with other gases. A further object is the production of concentrated acetylene gas by removing same from admixture with other hydrocarbons and hydrogen. A still further object is the recovery of acetylene from gaseous products obtained by cracking oils at temperatures such as are obtainable in the electric arc. A still further object is the separation of acetylene contaminated only by any ethane that may be present from hydrogen and higher boiling hydrocarbons. Other objects will appear hereinafter.

These objects are accomplished by the following invention which comprises scrubbing or washing crude gas with a solvent in such a manner as to dissolve the acetylene and the more soluble compounds, outgassing the solvent so as to recover a mixture of acetylene and gaseous constituents boiling above acetylene, then rectifying the gaseous mixture so as to recover acetylene as a gas and the higher boiling constituents as a liquid.

The figure is a diagrammatical drawing of the apparatus and process for carrying out the invention.

The following example is given for illustrating in detail the method involved in carrying out the invention. This example is to be considered only as illustrative and not as limiting the invention described.

Example I

The crude gas obtained by operating an electric arc submerged in oil was introduced into the system by way of conduit 2. This crude gas was compressed by compressor 4 to a pressure of approximately 150 pounds per square inch gauge. From compressor 4 it was introduced via conduit 6 into trap 8 where any oil contained therein was removed. Crude gas from trap 8 was then introduced via conduit 10 into the bottom of the acetone scrubber 12. Acetone admitted into the top of the scrubber via conduit 14 through spray 16 washed and scrubbed the gas so as to remove the acetylene and that fraction more soluble in acetone than acetylene from admixture with the less soluble fraction. The less soluble fraction passed out of the acetone scrubber via conduit 18. As this gas contained a high percentage of acetone vapors it was passed into water scrubber 20 where it was scrubbed with water admitted through conduit 22 and spray 24. The less soluble fraction free of acetone was carried out of the system by conduit 26. The acetone containing acetylene and the more soluble components, together with a small amount of the less soluble components dissolved therein, were removed from the bottom of the acetone scrubber 12 through conduit 28 and expansion valve 30 where the pressure was reduced to approximately 15 pounds gauge. The acetone solution was then introduced via conduit 32 into the second acetone scrubber 34. Here under the reduced pressure the components less soluble in acetone than acetylene together with a small amount of acetylene were outgassed and the acetylene was removed from this outgas by scrubbing the outgas with acetone admitted via conduit 36 and spray 38. These less soluble components were then drawn off from the top of the acetone scrubber 34 via conduit 40 and as they contained acetone vapors were introduced into the water scrubber 42 where the acetone was removed by water admitted through spray 44. The less soluble components freed of acetone were removed from the system via conduit 46. The acetone solution of acetylene and components more soluble in acetone than acetylene were drawn from the bottom of the actone scrubber 34 through conduit 48 and expansion valve 50. Here the pressure on the liquid was reduced to atmospheric and the solution was introduced into the boiler 52 via conduit 54. The acetone solution was boiled by passing steam through the steam coil 56 and thus effectively outgassed of acetylene and the more soluble components. This gas mixture was passed from the boiler 52 through conduit 58 and into the backward return condenser 60. Here the acetone contained in the gases was condensed and reflux conditions were established by returning the acetone to the boiler via conduit 62. The acetylene and less volatile components containing some acetone vapor were drawn off from the top of the backward return condenser 60 and introduced via pipe 64 into the water scrubber 66 where the acetone was removed by water introduced through spray 68. The acetylene containing gases were then drawn off from the water scrubber 66 through conduit 70 into the drier 72 where water vapor was removed. From the drier 72 the acetylene containing gases were passed via conduit 74 into compressor 78 where they were compressed to approximately 40 pounds per square inch gauge. From the compressor 78 they were introduced via conduit 80 and heat interchanger 81 into the rectifying column 82. Rectifying column 82 was operated by heating the liquid at the base of the column in calandria 84 to a temperature of approximately +15° C. and by cooling gases in the condenser 86 at the top of the rectifying column at a temperature of approximately −60° C. Under these conditions the pure acetylene was recovered as a gas from the top of the rectifying column through heat interchanger 81 via conduit 88 and the liquid fraction containing the less volatile components was removed as a liquid via conduit 90 at the bottom of the rectifying column. Acetone freed of acetylene was removed from boiler 52 via conduit 92 and thence through the cooler 94 where it was cooled and returned to the acetone storage tank 98. From the acetone storage tank 98 it was recirculated as the scrubbing liquid via conduits 14 and 36. Branching conduit 100 conducted the water-acetone solution from the bottom of each of the water scrubbers 20, 42, and 66 to the rectifying column 102. Here the water was separated as a liquid and the acetone as a gas by simple rectification. The gaseous acetone passed via conduit 104 to cooler 106 where it was condensed and returned to the acetone storage tank 98. In this manner substantially pure acetylene was separated from gaseous constituents boiling above and below acetylene.

The above process is a detailed description of the preferred embodiment of the invention. It is of course recognized that the gas may be obtained from any source other than that specifically disclosed. The process is adapted for separating acetylene from any gaseous mixture in which there are gases that boil above and below acetylene. In place of acetone for the scrubbing of the crude gas, any other solvent may be used. It is particularly desirable to use a solvent which has a high solubility coefficient for acetylene; for example ethyl oxalate. The scrubbing step is carried out at normal temperature; that is, at the temperature which the scrubber will naturally assume when standing in a building or a shed. The temperature of the liquid in the scrubber will vary of course with the concentration of acetylene in the solvent due to the heat of solution. Thus the solution containing dissolved acetylene in the scrubber may be several degrees above the atmospheric temperature. However, the temperature will seldom be as low as 0° C., and the scrubbing step might properly be considered as being operated at room temperature. It is also obvious that the scrubber may operate at any temperature within the range that it would naturally assume due to changes in atmospheric temperature. The solvent recovery system as described in the example for use in connection with acetone will vary depending upon the solvent used. If the solvent is relatively non-volatile, scrubbers for removing the solvent from the gaseous fraction more volatile than acetylene may be omitted. The second scrubbing step which is primarily adapted to outgas any gases more volatile than acetylene may be omitted if the solvent used dissolves a negligible quantity of such gases. The acetylene and the less volatile constituents may be outgassed by either heating, or reducing the pressure, or both as shown in the example above. The steps of scrubbing the acetylene gas containing the less volatile constituents with water and then drying same of course depends upon the type of solvent used in the prior scrubbing steps. The crude gas may be scrubbed under any pressure. It is preferred, however, to use pressures between 4 and 18 atmospheres absolute.

The rectification step carried out in the rectifier 82 is most safely operated at a presure between about 2 and about 5 atmospheres, but may be operated at pressures ranging from about 1⅓ to about 30 atmospheres.

As the drawing is purely diagrammatical, the equivalents of the various pieces of apparatus shown may be used; for example, the compressor 4 in the figure is shown as a single stage compressor. It is not intended that the process and apparatus be so limited. The figure in the drawing merely represents the function of compressing the gases. When the incoming gases are at atmospheric pressure and the pressure must be increased to 11 atmospheres, a two or three-stage compressor would be required with water coolers between each stage. Similar type changes can be made in the other pieces of apparatus without departing from the spirit of the invention. Such changes are within the skill of those versed in the art.

The temperatures maintained at the top and the bottom of the rectifying column are those such as will separate the acetylene as a gas and the less volatile constituents as a liquid. The specific conditions of course will depend upon the pressure under which the column operates.

It is apparent that many widely different embodiments of this invention may be made without departing from the spirit and scope thereof and therefore it is not intended to be limited except as indicated in the appended claims.

I claim:

1. The process for the recovery of acetylene from admixture with other components boiling above and below acetylene, which comprises scrubbing the mixture at a temperature within the range known as room temperatures with a solvent having a high solubility coefficient for acetylene at an elevated pressure thereby dissolving the acetylene and the components boiling above acetylene, reducing the pressure on the resulting solution so as to slightly outgas same and thus remove any low boiling components which may have been dissolved therein, contacting the outgas with fresh selective solvent so as to redissolve the major part of the acetylene which may have been outgassed, then further reducing the pressure on the solution and raising the temperature thereof so as to completely outgas the acetylene and higher boiling components, rectifying the resulting acetylene and higher boiling component mixture so as to separate acetylene as a gas and the higher boiling components as a liquid, said rectification being conducted at a pressure between about two atmospheres and about five atmospheres and by boiling the liquid at the base of the rectifying column at a temperature that will expel acetylene, and cooling the gases at the top of the rectifying column to a temperature that will condense the components contained therein boiling above acetylene, thereby furnishing reflux in said column.

2. The process in accordance with claim 1 characterized in that the selective solvent is acetone.

DALE F. BABCOCK.